(12) United States Patent
Rickenbach et al.

(10) Patent No.: US 8,677,955 B2
(45) Date of Patent: Mar. 25, 2014

(54) SINGLE POPPET VALVE CYLINDER HEAD ASSEMBLY FOR INTERNAL COMBUSTION ENGINE

(75) Inventors: Joel Seth Rickenbach, Oelrichs, SD (US); Michael Dean Leraas, Kernersville, NC (US); Joel Thomas Rickenbach, Hot Springs, SD (US)

(73) Assignee: Westrom Engineering, LLC, Hot Springs, SD (US)

( * ) Notice: Subject to any disclaimer, the term of this patent is extended or adjusted under 35 U.S.C. 154(b) by 414 days.

(21) Appl. No.: 12/978,469

(22) Filed: Dec. 24, 2010

(65) Prior Publication Data

US 2011/0162607 A1 Jul. 7, 2011

Related U.S. Application Data

(60) Provisional application No. 61/335,240, filed on Jan. 4, 2010.

(51) Int. Cl.
*F01L 1/28* (2006.01)

(52) U.S. Cl.
USPC ............ 123/79 C; 123/90.48; 123/90.31

(58) Field of Classification Search
USPC ......... 123/90.48, 90.31, 193.5, 188.14, 79 R, 123/79 C
See application file for complete search history.

(56) References Cited

U.S. PATENT DOCUMENTS

| | | | |
|---|---|---|---|
| 2,191,745 A * | 2/1940 | Barkeij | 123/79 C |
| 2,804,859 A * | 9/1957 | Dobrossavlyevitch | 123/275 |
| 3,583,372 A * | 6/1971 | Hoffmann | 123/275 |
| 3,763,716 A * | 10/1973 | Blomberg | 74/604 |
| 4,075,986 A * | 2/1978 | Keck | 123/79 R |
| 4,273,083 A * | 6/1981 | Moiroux | 123/79 R |
| 4,484,542 A * | 11/1984 | Krauser | 123/41.69 |
| 4,487,171 A * | 12/1984 | Vosper | 123/79 R |
| 4,523,559 A * | 6/1985 | Latsch et al. | 123/306 |
| 4,599,859 A * | 7/1986 | Urso | 60/514 |
| 5,060,607 A * | 10/1991 | Taniguchi | 123/90.51 |
| 5,331,929 A * | 7/1994 | Plantan | 123/79 R |
| 5,347,961 A * | 9/1994 | Buehrle et al. | 123/90.11 |
| 5,626,107 A * | 5/1997 | De Blasi | 123/81 B |
| 5,662,079 A * | 9/1997 | Snider | 123/188.14 |
| 5,671,704 A * | 9/1997 | Peng | 123/79 R |
| 5,957,106 A * | 9/1999 | Maloney et al. | 123/296 |
| 6,273,038 B1 * | 8/2001 | Kutlucinar et al. | 123/79 R |
| 6,848,408 B1 * | 2/2005 | Mendler | 123/184.21 |
| 7,017,538 B2 * | 3/2006 | Lim | 123/79 R |
| 8,056,541 B1 * | 11/2011 | Nick | 123/533 |
| 2008/0078351 A1 * | 4/2008 | Thomas et al. | 123/190.8 |

* cited by examiner

*Primary Examiner* — Thai Ba Trieu
*Assistant Examiner* — Thomas Olszewski
(74) *Attorney, Agent, or Firm* — Slater & Matsil, L.L.P.

(57) ABSTRACT

A cylinder head assembly for an internal combustion engine having an intake cycle and an exhaust cycle is provided. The cylinder head assembly includes a single valve, a cylinder head body, and a venturi tube. The cylinder head body has an intake port, an exhaust port, and a combustion chamber port configured to intermittently seat the single valve. The venturi tube is disposed within the cylinder head body and has a high pressure portion operably coupled to the cylinder head body proximate the intake port and a distal end spaced apart from the combustion chamber port. The venturi tube permits the intake port to remain in fluid communication with the exhaust port during both the intake cycle and the exhaust cycle of the internal combustion engine.

20 Claims, 7 Drawing Sheets

SINGLE POPPET VALVE CYLINDER HEAD ASSEMBLY FOR INTERNAL COMBUSTION ENGINE

CROSS-REFERENCE TO RELATED PATENT APPLICATIONS

This patent application claims the benefit of U.S. Provisional Patent Application No. 61/335,240, filed Jan. 4, 2010, the teachings and disclosure of which are hereby incorporated in their entireties by reference thereto.

BACKGROUND

Internal combustion engines have cylinder heads that utilize valves to regulate the intake of air into, and the expulsion of exhaust gas from, a combustion chamber in a manifold. Conventional cylinder head designs for Otto and Diesel cycle internal combustion engines use at least one valve for the intake of air and at least one more valve for the expulsion of exhaust gas. As such, a minimum of two valves per cylinder head are required to perform the intake and exhaust cycles in the typical internal combustion engine.

BRIEF DESCRIPTION OF THE DRAWINGS

The accompanying drawings incorporated in and forming a part of the specification illustrate several aspects of the present disclosure and, together with the description, serve to explain the principles of the present disclosure in the drawings.

DETAILED DESCRIPTION OF THE DRAWINGS

Figure 1:
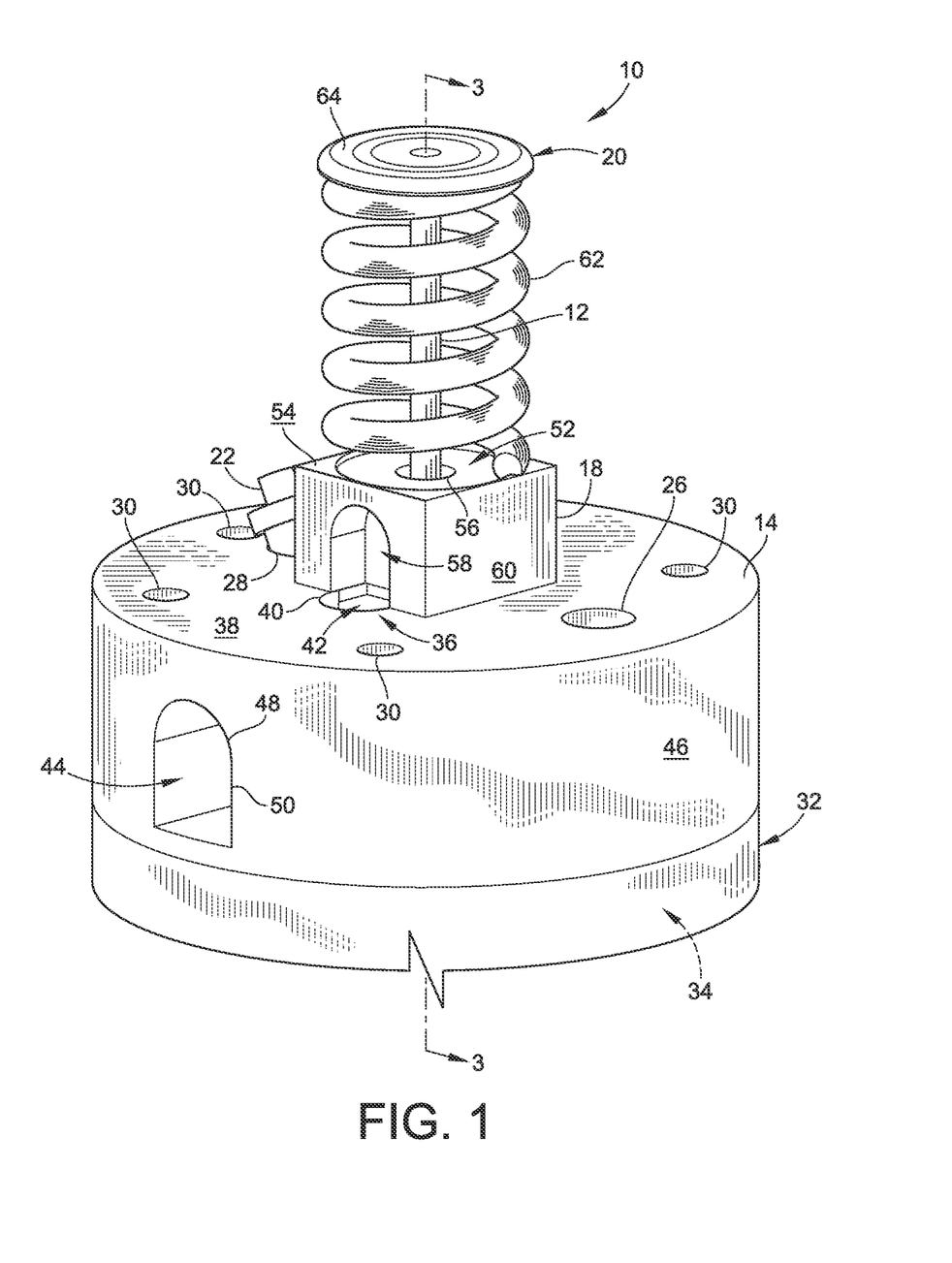
FIG. 1 is a perspective view of a cylinder head assembly having a single valve and configured to manage both an intake cycle and an exhaust cycle of an internal combustion engine.
Figure 2:
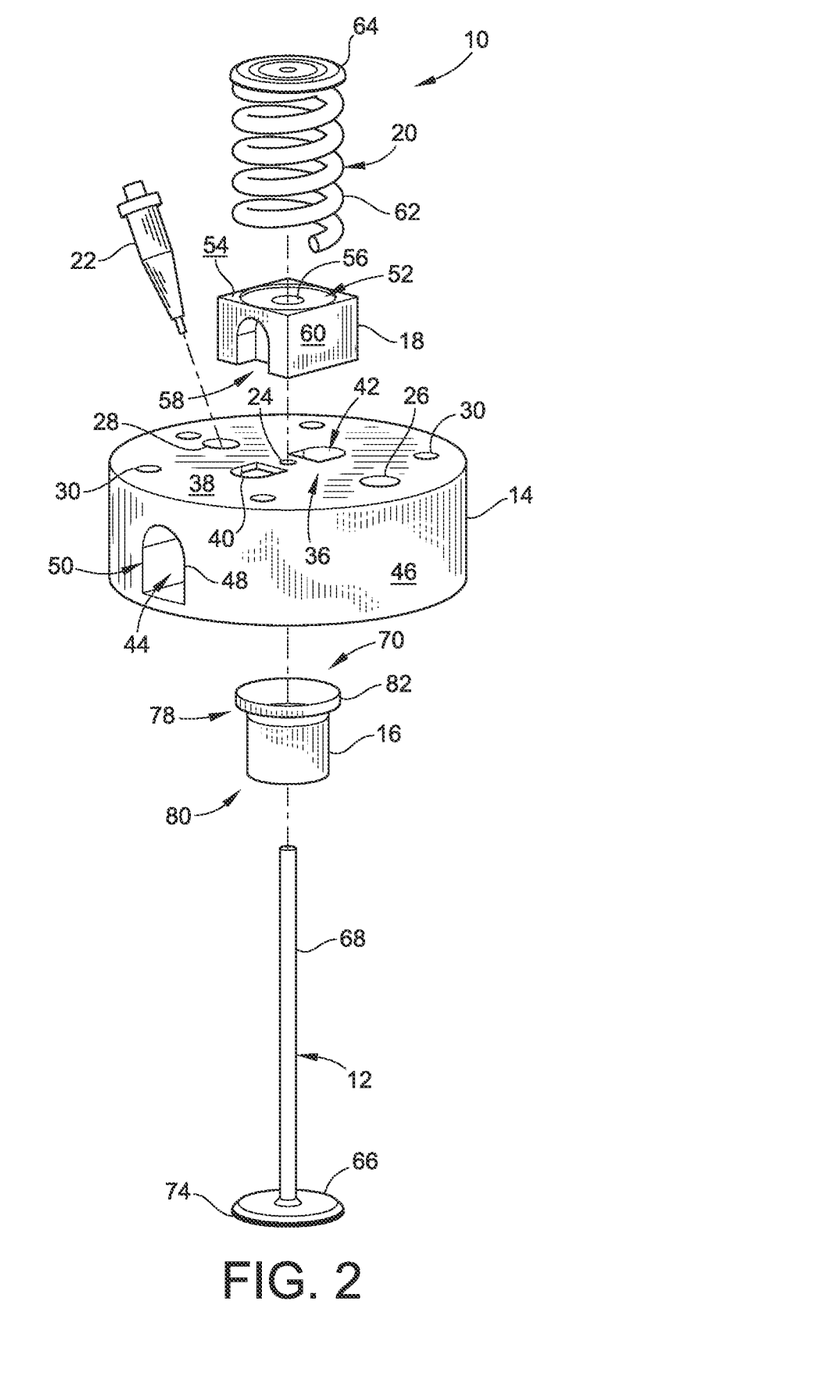
FIG. 2 is an exploded view of the cylinder head assembly of FIG. 1.

Referring to FIGS. 1 and 2, one embodiment of a cylinder head assembly 10 is illustrated. In some embodiments the cylinder head assembly 10 includes a single valve 12 (a.k.a., a poppet valve), a cylinder head body 14, and a venturi tube 16. In some embodiments, the cylinder head assembly 10 also includes an intake block 18, a resilient member retainer assembly 20, and a fuel injector 22. As will be more fully explained below, the cylinder head assembly 10 permits Otto and Diesel cycle internal combustion engines to operate efficiently using a single valve 12 to manage both the intake of air and the expulsion of exhaust gas.

As shown in FIGS. 1 and 2, in some embodiments the cylinder head body 14 is formed as a short, wide cylinder and is constructed from metal or another durable material. The cylinder head body 14 includes a valve guide 24, a push rod guide 26, a fuel injector receptacle 28, and bolt channels 30, each passing entirely through the cylinder head body 14. The bolt channels 30 are configured to receive threaded bolts used to secure the cylinder head body 14 to a cylinder block 32 of an internal combustion engine using threaded nuts. In such a configuration, the cylinder head body 14 generally resides above a combustion chamber 34 in the cylinder block 32.

In some embodiments, the cylinder head body 14 includes one or more intake ports 36 which a fluid (e.g., air, an exhaust gas, and/or a combination thereof) may pass through. As shown in FIG. 2, the intake ports 36 pass through and are generally planar with a top surface 38 of the cylinder head body 14. Each of the intake ports 36 defines a periphery 40 that establishes an intake port area 42. The sum of all the intake port areas 42 may be collectively referred to as the gross intake port area. While the intake ports 36 of FIG. 2 are disposed on opposing sides of the valve guide 24, the intake ports may be otherwise oriented. In addition, the periphery 40 of the intake ports 36 may form a variety of different two-dimensional shapes when the cylinder head body 14 is viewed from above.

Figure 3:
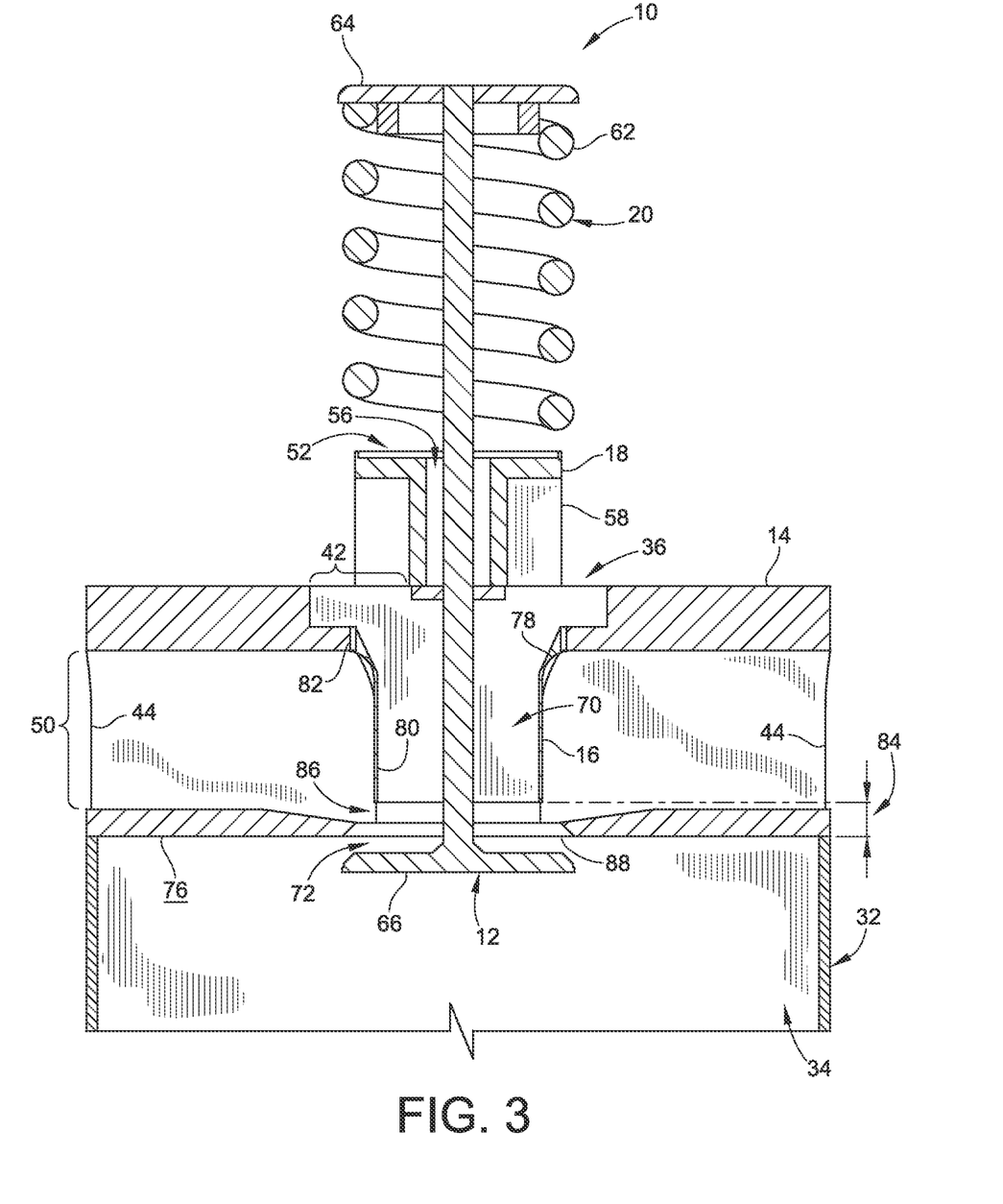
FIG. 3 is a cross-section view of the cylinder head assembly taken along line 3-3 in FIG. 1.

In some embodiments, the cylinder head body 14 includes one or more exhaust ports 44, which a fluid air, an exhaust gas, and/or a combination thereof) may pass through. As shown in FIG. 2, the exhaust ports 44 pass through a side wall 46 of the cylinder head body 14. Each of the exhaust ports 44 defines a periphery 48 that establishes an exhaust port area 50. The sum of all exhaust port areas 50 may be collectively referred to as the gross exhaust port area. While the exhaust ports 44 of FIGS. 1-3 are disposed on opposing sides of the cylinder head body 14, the exhaust ports may be otherwise oriented. In addition, the periphery 48 of the exhaust ports 44 may form a variety of different two-dimensional shapes when the cylinder head body 14 is viewed from the side.

A ratio of the gross intake port area to the gross exhaust port area may be adjusted through empirical tuning in order to improve the operation and/or efficiency of the internal combustion engine. In some embodiments, the ratio is in the range of about 2.5 to 1 to about 3. 5 to 1.

As shown in FIGS. 1 and 2, the intake block 18 is interposed between the cylinder head body 14 and the resilient member retainer assembly 20. The intake block 18 is constructed from metal or another durable material and may be secured (e.g., by a weld, etc.) to the top surface 38 or top portion of cylinder head body 14. In some embodiments, the intake block 18 may be integrally formed with the cylinder head body 14. The intake block 18 includes a resilient member recess 52 formed in a top surface 54 and a valve guide 56 passing entirely through the intake block 18. In some embodiments, the intake block 18 further includes flow guides 58 formed in a side wall 60. The flow guides 58 generally correspond to the position of the intake ports 36 on the cylinder head body 14. Although the flow guides 58 are disposed on opposing sides of the intake block, the flow guides 58 may be otherwise oriented.

Still referring to FIGS. 1 and 2, the resilient member retainer assembly 20 includes a resilient member 62 (e.g., a spring, etc.) and a retaining member 64. In some embodiments, a lower portion of the resilient member 62 (as oriented in FIG. 1) is dimensioned to In within the resilient member recess 52 of the intake block 18. In addition, an upper portion of the resilient member 62 (as oriented in FIG. 1) is configured to engage with a bottom surface or portion of the retaining member 64. In some embodiments, the resilient member 64 is interposed between the retaining member 64 and the intake block 18.

As shown in FIG. 2, the valve 12 includes a poppet portion 66 secured to an end of a stem portion 68. The stem portion 68 is a long, thin cylinder having dimensions permitting the stem portion to be moveably received within a channel 70 of the venturi tube 16, the valve guide 24 in the cylinder head body 14, and the valve guide 56 in the intake block 18 and to pass through the resilient member 62 of the resilient member retainer assembly 20, in some embodiments, the poppet portion 66 is generally a flat disc having dimensions permitting the poppet portion 66 to seat within or against a combustion port 72 (FIG. 3). To promote sealing of the combustion chamber 34 when the poppet portion 66 is biased toward or engaged with the combustion chamber port 72, the poppet portion 66 may be equipped with a sealing member 74 disposed about a periphery thereof.

Figure 4:
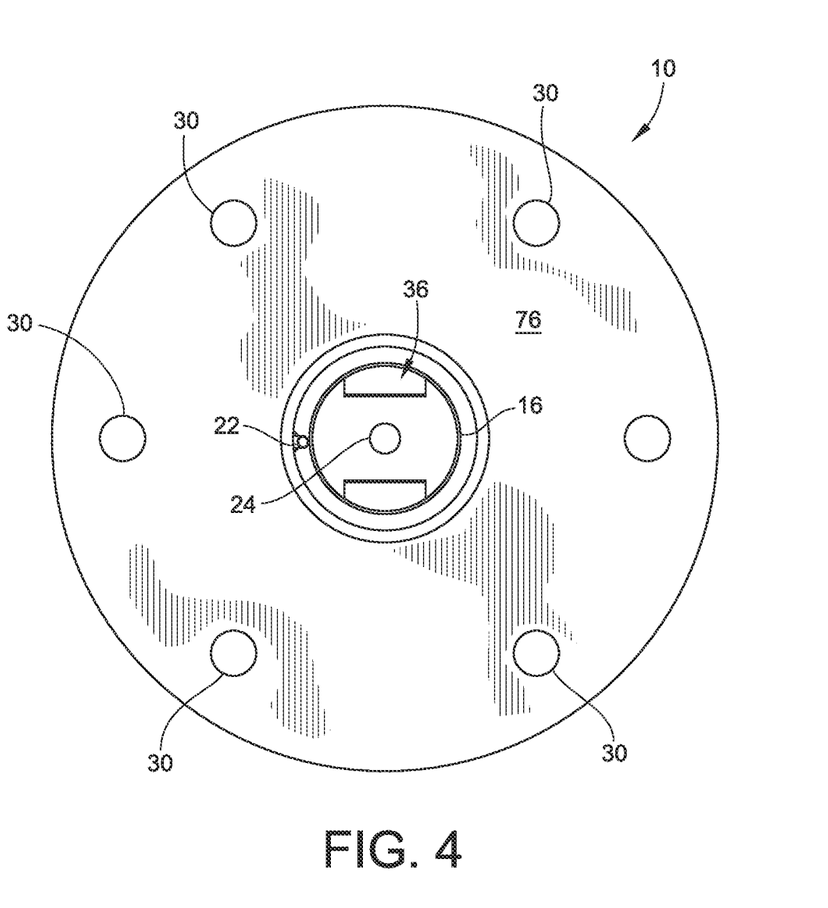
FIG. 4 is a bottom view of the cylinder head assembly of FIG. 1.

As shown in FIGS. 1 and 2, the fuel injector 22 is disposed in the fuel injector receptacle 28 of the cylinder head body 14. As shown in FIG. 4, which depicts a bottom surface 76 of the cylinder head body 14, a tip or distal end of the fuel injector 22 projects from the cylinder head body 14 in order to be in fluid communication with the combustion chamber 34 (FIG. 1).

Referring to FIGS. 2 and 3, the venturi tube 16 (a.k.a., a tube venturi or a univalve) is illustrated. The venturi tube 16 is generally hollow and, as such, defines the channel 70 passing therethrough. The channel 70 generally constricts from a high pressure portion 78 of the venturi tube 16 to a low pressure portion 80. The portion of the channel 70 proximate the high pressure portion 78 of the venturi tube 16 is generally wider than the portion of the channel 70 proximate the low pressure portion 80. In some embodiments, the venturi tube 16 includes a rim 82 extending circumferentially around the venturi tube 16 proximate the high pressure portion 78.

Referring now to FIGS. 3 and 4, the combustion chamber port 72 of the cylinder block 32 is configured to seat, engage, and/or receive the poppet portion 66 of the valve 12. In some embodiments, the combustion chamber port 72 is tapered such that the widest portion of the combustion chamber port 72 is adjacent the bottom surface 76 of the cylinder head body 14. As shown in FIG. 3, the combustion chamber port 72 generally opens to the combustion chamber 34 disposed below (as oriented in FIG. 3) the cylinder head body 14.

As shown in FIGS. 1 and 3, an end of the stem portion 68 of the valve 12 is secured to the retaining member 64 of the resilient member retainer assembly 20 when the cylinder head assembly 10 is assembled. Also, the stem portion 68 of the valve 12 passes through combustion chamber port 72, the channel 70 of the venturi tube 16, the valve guide 24 in the cylinder head body 14, the valve guide 56 in the intake block 18, and the resilient member 62, in this configuration, the compression-resisting force of the resilient member 62 biases the poppet portion 66 of the valve 12 toward the combustion chamber port 72.

In addition, and as shown in FIG. 3, the venturi tube 16 is generally disposed within the cylinder head body 14 when the cylinder head assembly 10 is assembled. In some embodiments, the rim 82 on the high pressure portion 78 of the venturi tube 16 is used to secure the cylinder head body 14 inward of but proximate or adjacent to, the intake ports 36. The rim 82 may secure to the cylinder head body 14 through, for example, a friction fit, a weld, or threads. In those embodiments, the venturi tube 16 may be removed and replaced with another venturi tube having one or more different characteristics (e.g., length, width, thickness, material, flow channel, channel size, configuration, etc). In some embodiments, the venturi tube 16 may be integrally formed with the cylinder head body 14.

As shown in FIG. 3, the low pressure portion 80 of the venturi tube 16 is disposed inwardly of, and spaced apart from, the combustion chamber 34. A distance 84 from the low pressure portion 80 of the venturi tube 16 to the combustion chamber 34 (directly beneath the venturi tube 16) may be adjusted through empirical tuning in order to improve the operation and/or efficiency of the internal combustion engine. In particular, the distance between a distal end 86 of the venturi tube 16 and a plane 88 flush with the bottom surface 76 of the cylinder head body 14 may be increased or decreased in order to improve the operation and/or efficiency of the internal combustion engine. In some embodiments, the distance 84 from the distal end 86 of the venturi tube 16 to the combustion chamber port 72 is in the range of about four tenths of an inch (0.40 in.) to about half an inch (0.50 in.).

In some embodiments, the distance 84 from the distal end 86 of the venturi tube 16 to the combustion chamber 34 and the ratio of the gross intake port area 42 to the gross exhaust port area 50 may be adjusted alternatively, simultaneously, or some combination thereof, through empirical tuning in order to improve the operation and/or efficiency of the internal combustion engine.

Figure 5:
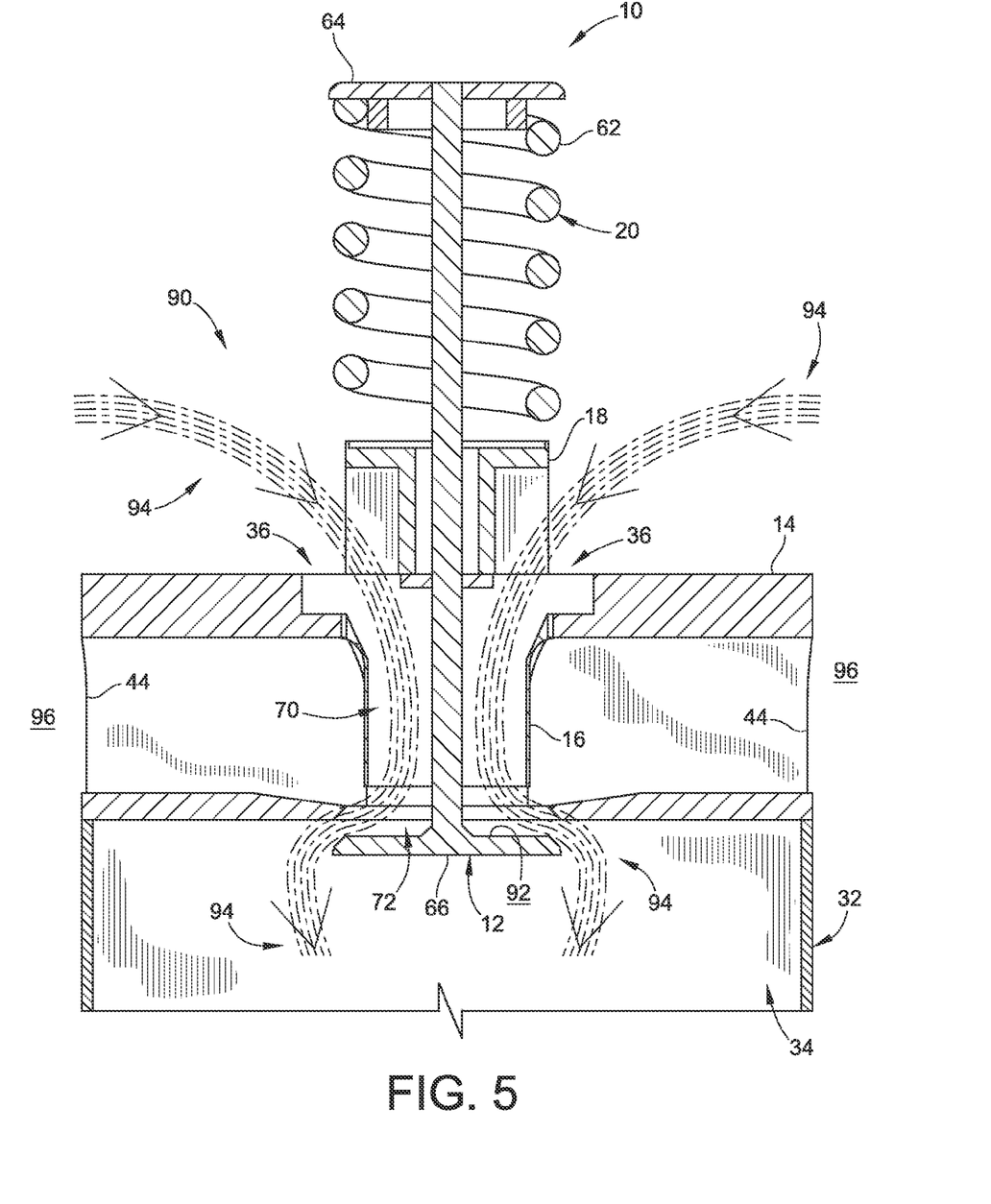
FIG. 5 is a cross section view of the cylinder head assembly of FIG. 1 illustrating an intake cycle.

In operation, and as illustrated in FIG. 5, the cylinder head assembly 10 undergoes an intake cycle 90. During the intake cycle 90, the valve 12 is biased downwardly (as oriented in FIG. 5) until the force of the resilient member 62 is overcome and the poppet portion 66 of the valve 12 unseats from the combustion chamber port 72. When this occurs, a fluid, in this case air, enters the cylinder head body 14 through the intake ports 36, passes through the channel 70 in the venturi tube 16 toward a back surface 92 of the poppet portion 66 of the valve 12, and flows through the combustion chamber port 72 into the combustion chamber 34. In this regard, the venturi tube 16 is able to establish an intake fluid flow path 94.

Notably, the intake ports 36 and the exhaust ports 44 are not sealed from one another during the intake cycle 90 illustrated in FIG. 5 when the intake fluid flow path 94 is established. Even so, while it is possible for air to flow in through the intake ports 36 and out through the exhaust ports 44 during the intake cycle 90, the air is encouraged to flow into the combustion chamber 34 by the low pressure existing in the low pressure portion 80 of the venturi tube 16 and/or the combustion chamber 34 relative to the high pressure existing in the ambient environment 96 outside the exhaust ports 44.

As the intake cycle 90 continues, the resilient member 62 is allowed to seat the poppet portion 66 against or within the combustion chamber port 72. Thereafter, the fuel injector 22 sprays fuel into the combustion chamber 34 and the air and fuel mixture is compressed, ignited, and burned to generate linear power. Even while the combustion chamber port 72 is closed off by the valve 12 during this phase of the intake cycle 90, the intake ports 36 and the exhaust ports 44 remain unsealed from each other.

Figure 6:
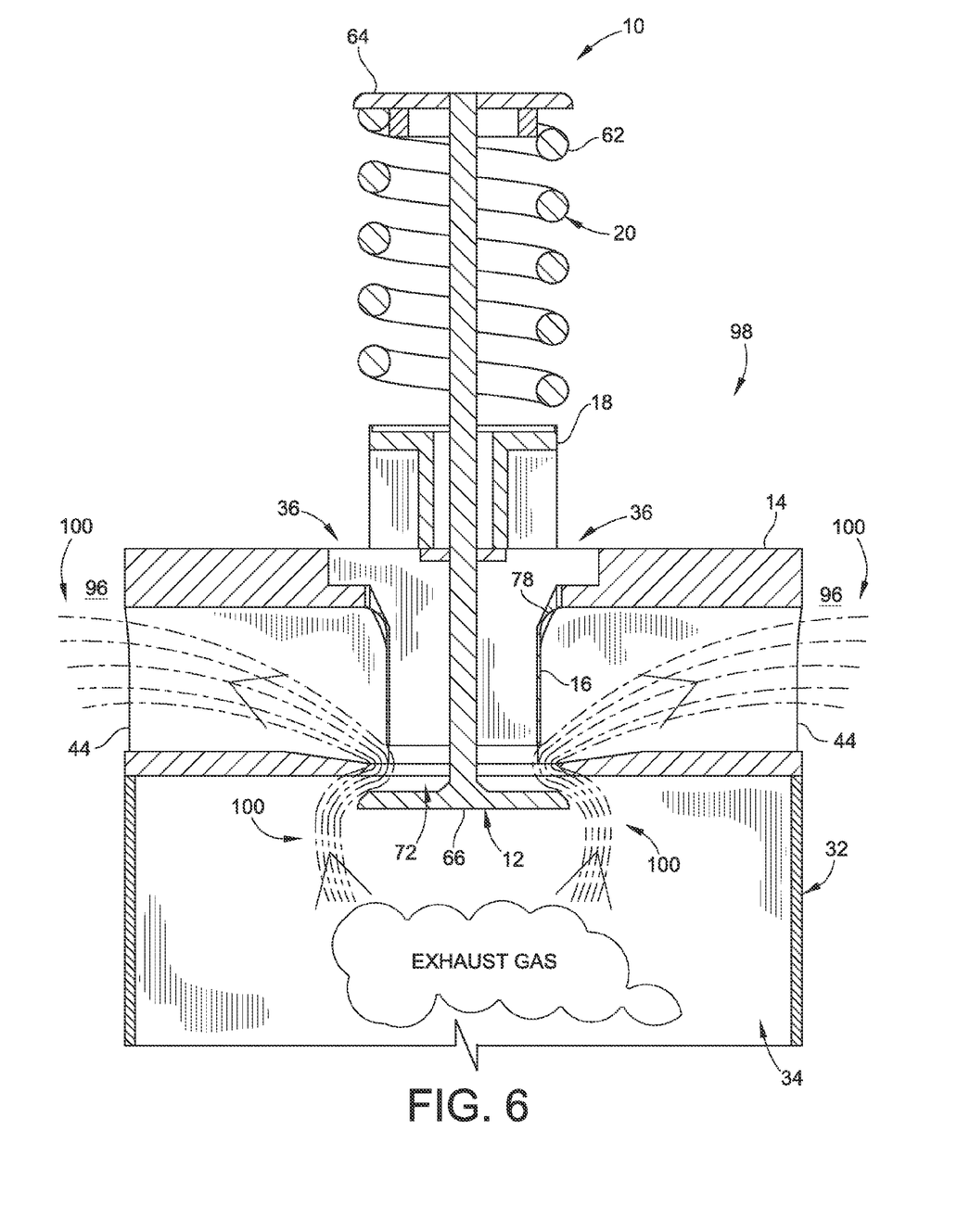
FIG. 6 is a cross section view of the cylinder head assembly of FIG. 1 illustrating an exhaust cycle.

Thereafter, the cylinder head assembly 10 undergoes an exhaust cycle 98 as illustrated in FIG. 6. During the exhaust cycle 98, the valve 12 is biased downwardly (as oriented in FIG. 5) until the force of the resilient member 62 is overcome and the poppet portion 66 of the valve 12 unseats from the combustion chamber port 72. When this occurs, exhaust gas generated by the burning of the fuel and air mixture is forced through the combustion chamber port 72, deflected by the end 86 of the venturi tube 16, and expelled from the cylinder head body 14 through the exhaust ports 44. In this regard, the venturi tube 16 is able to establish an exhaust fluid flow path 100.

Notably, the intake ports 36 and the exhaust ports 44 are not sealed from one another during the exhaust cycle 98 illustrated in FIG. 6 when the exhaust fluid flow path 100 is established. Even so, while it is possible for the exhaust gas to flow out of the cylinder head body 14 through the intake ports 36, the empirical tuning noted above may be used to encourage the fluid to exit the cylinder head body 14 through the exhaust ports 44. In some embodiments, the larger exhaust port area 50 relative to the smaller intake port area 42 and/or the lower pressure of the ambient environment 96 relative to the pressure within the combustion chamber 34 may also encourage the exhaust gas to travel along the exhaust fluid flow path 100.

After the exhaust gas has been expelled from the combustion chamber 34, the resilient member 62 is allowed to seat the poppet portion 66 against or within the combustion chamber port 72 and the exhaust cycle 98 of FIG. 6 is completed. Even while the combustion chamber port 72 is closed off by the valve 12 during this phase of the exhaust cycle 98, the intake ports 36 and the exhaust ports 44 remain unsealed from each other. After the exhaust cycle 98 of FIG. 6 is concluded, the intake cycle 90 of FIG. 5 is once again initiated and the process repeats.

Figure 7:
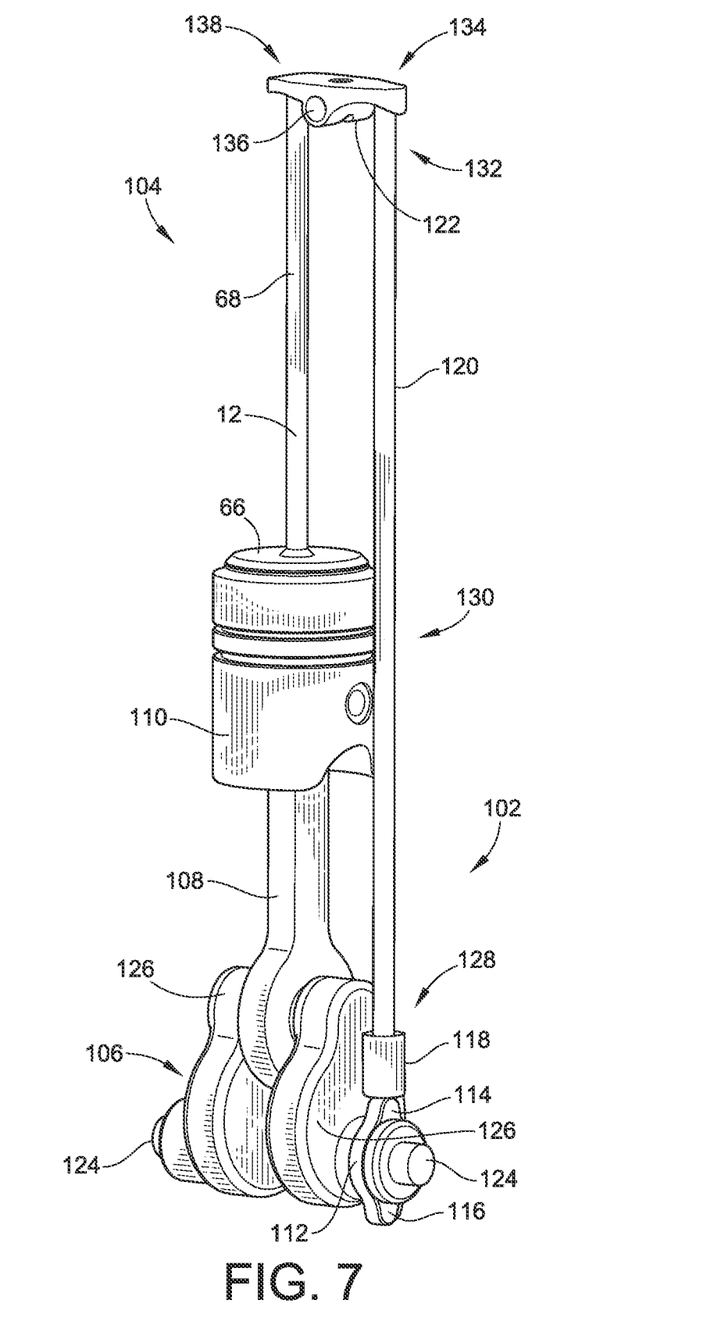
FIG. 7 is a perspective view of a valve train assembly configured for use with the cylinder head assembly of FIG. 1.

In some embodiments, the cylinder head assembly 10 of FIGS. 1 and 2 is operably coupled with a valve train assembly 102 of FIG. 7 to form a internal combustion engine assembly 104. To illustrate the manner in which the cylinder head assembly 10 and the valve train assembly 102 are operably coupled together to form the internal combustion assembly 104, the valve 12 from the cylinder head assembly 10 of FIGS. 1 and 2 is depicted in FIG. 7 to provide a frame of reference. While only the valve 12 from the cylinder head assembly 10 of FIGS. 1 and 2 has been shown in FIG. 7, those skilled in the art will recognize that other components from the cylinder head assembly 10 of FIGS. 1 and 2 may also be included in the internal combustion assembly 104 but have been intentionally omitted from FIG. 7 for ease of illustration.

The valve train assembly 102 of FIG. 7 generally includes a crankshaft assembly 106, a connecting rod 108, a piston 110, a cam 112 having an intake cam lobe 114 and an exhaust cam lobe 116, a valve lifter 118, a push rod 120, and a rocker arm 122. As shown in FIG. 7, the crankshaft assembly 106 includes a crankshaft axle 124 supporting cams 126. The cams 126 of the crankshaft assembly 106 are operably coupled to the connecting rod 108. The connecting rod 108 is operably coupled to the piston 110, which is configured to translate up and down in the combustion chamber 34 of FIG. 1.

Still referring to FIG. 7, the crankshaft axle 124 supports the cam 112, which includes the intake cam lobe 114 and exhaust cam lobe 116. Therefore, the valve train assembly 102 need not include a separate cam shaft supporting the intake cam lobe 114 and exhaust cam lobe 116. The intake cam lobe 114 and exhaust cam lobe 116 are configured to engage and disengage with the valve lifter 118 as the crankshaft axle 124 rotates. The valve lifter 118 is secured to one end 128 of the push rod 120. In some embodiments, a middle portion 130 of the push rod 120 passes through the push rod guide 26 of FIG. 1, which serves as a guide when the push rod 120 translates up and down.

The other end 132 of the push rod 120 is configured to engage a push rod end 134 of the rocker arm 122. The rocker arm 122 is configured to pivot about a rocker arm axle 136. The stem portion 68 of the valve 12 is configured to engage (either directly or indirectly through the retaining member 64 of FIG. 1) a valve end 138 of the rocker arm 122. In some embodiments, the valve 12 from the cylinder head assembly 10 and the piston 110 from the valve train assembly 102 are generally vertically aligned as shown in FIG. 7.

In operation, the crankshaft axle 124 of the valve train assembly 102 rotates until the intake cam lobe 114 engages and raises and the valve lifter 118. The raised valve lifter 118 drives the push rod 120 upwardly (as oriented in FIG. 7) toward the push rod end 134 of the rocker arm 122, which causes the rocker arm 122 to pivot. As the rocker arm 122 pivots, the valve end 138 of the rocker arm 122 drives the valve 12 downwardly (as oriented in FIG. 7). The downwardly driven valve 12 opens the combustion chamber port 72 and initiates the intake cycle as shown in FIG. 5.

As the crankshaft axle 124 continues to rotate, the intake cam lobe 114 moves passed the valve lifter 118 and permits the valve lifter to fall. The fallen valve lifter 118 allows the push rod 120 to move downwardly (as oriented in FIG. 7) away from the push rod end 134 of the rocker arm 122, which causes the rocker arm 122 to pivot. As the rocker arm 122 pivots, the valve end 138 of the rocker arm 122 permits the valve 12 to move upwardly (as oriented in FIG. 7). The upward movement of the valve 12 closes the combustion chamber port 72 and terminates the intake cycle shown in FIG. 5. Thereafter, the normal combustion process of an internal combustion engine takes place.

During the normal combustion process, the crankshaft axle 124 of the valve train assembly 102 continues to rotate until the exhaust cam lobe 116 engages and raises and the valve lifter 118. The raised valve lifter 118 drives the push rod 120 upwardly (as oriented in FIG. 7) into the push rod end 134 of the rocker arm 122, which causes the rocker arm 122 to pivot. As the rocker arm 122 pivots, the valve end 138 of the rocker arm 122 drives the valve 12 downwardly (as oriented in FIG. 7). The downwardly driven valve 12 opens the combustion chamber port 72 and initiates the exhaust cycle as shown in FIG. 6.

As the crankshaft axle 124 continues to rotate, the exhaust cam lobe 116 moves passed the valve lifter 118 and permits the valve lifter to fall. The fallen valve lifter 118 allows the push rod 120 to move downwardly (as oriented in FIG. 7) away from the push rod end 134 of the rocker arm 122, which causes the rocker arm 122 to pivot. As the rocker arm 122 pivots, the valve end 138 of the rocker arm 122 permits the valve 12 to move upwardly (as oriented in FIG. 7).

The upward movement of the valve 12 closes the combustion chamber port 72 and terminates the exhaust cycle shown in FIG. 6. Thereafter, the crankshaft axle 124 of the valve train assembly 102 rotates until the intake cam lobe 114 engages and raises and the valve lifter 118 and the combustion cycle as generally described herein begins again. Notably, the valve 12 opens and doses twice per combustion cycle.

From the foregoing, those skilled in the art will recognize that the cylinder head assembly 10 employs a single valve configured to manage both the intake cycle 90 and the exhaust cycle 98 of an internal combustion engine

What is claimed is:

1. A cylinder head assembly for an internal combustion engine having an intake cycle and an exhaust cycle, comprising:

a cylinder head body having an intake port, an exhaust port, and a combustion chamber port, the combustion chamber port configured to intermittently seat a single valve; and a venturi tube disposed within the cylinder head body, the venturi tube having a high pressure portion operably coupled to the cylinder head body proximate the intake port and a distal end spaced apart from the combustion chamber port, the venturi tube having a distal end which is spaced from the combustion chamber port thereby permitting the intake port to remain in fluid communication with the exhaust port at all times during and through both the intake cycle and the exhaust cycle of the internal combustion engine.

2. The cylinder head assembly of claim 1, wherein the intake port remains in fluid communication with the exhaust port when the single valve is biased away from the combustion chamber port.

3. The cylinder head assembly of claim 1, wherein the intake port remains in fluid communication with the exhaust port when the single valve is biased toward the combustion chamber port.

4. The cylinder head assembly of claim 1, wherein the distal end is disposed entirely within the cylinder head body.

5. The cylinder head assembly of claim 1, wherein the intake port defines an intake port area, the exhaust port defines an exhaust port area, and a ratio of the intake port area to the exhaust port area is in the range of about 2.5 to 1 to about 3.5 to 1.

6. The cylinder head assembly of claim 1, wherein the distal end is spaced apart from the combustion chamber port a distance between about 0.40 inches and 0.50 inches.

7. The cylinder head assembly of claim 1, wherein the venturi tube is integrally formed with cylinder head body.

8. The cylinder head assembly of claim 1, wherein the venturi tube is interchangeable with another venturi tube having at least one different characteristic relative to the venturi tube.

9. The cylinder head assembly of claim 1, wherein the cylinder head assembly is operably coupled to a valve train assembly having a cam mounted on a crankshaft axle, the cam having an intake cam lobe and an exhaust cam lobe configured to bias the single valve away from the combustion chamber port.

10. The cylinder head assembly of claim 9, wherein the cylinder head assembly is operably coupled to a valve train assembly free of a earn shaft configured to support the intake cam lobe and the exhaust cam lobe.

11. The cylinder head assembly of claim 1, wherein the cylinder head assembly further comprises an intake block interposed between the cylinder head body and a resilient member retainer assembly biasing the single valve toward the combustion chamber port.

12. A cylinder head assembly for an internal combustion engine having an intake cycle and an exhaust cycle, comprising:
   a single valve;
   a cylinder head body having an intake port, an exhaust port, and a combustion chamber port, the combustion chamber port configured to intermittently seat the single valve; and
   a venturi tube disposed within the cylinder head body, the venturi tube establishing a first fluid flow path through the intake port, a channel of the venturi tube, and the combustion chamber port during the intake cycle and a second fluid flow path through the combustion chamber port, around a distal end of the venturi tube, and through the exhaust port during the exhaust cycle, the intake port remaining in fluid communication with the exhaust port through a space between the distal end of the venturi tube and the combustion chamber port at all times during and through both the intake cycle and the exhaust cycle of the internal combustion engine.

13. The cylinder head assembly of claim 12, wherein the intake port remains in fluid communication with the exhaust port when the single valve is both seated against and unseated from the combustion chamber port.

14. The cylinder head assembly of claim 12, wherein the venturi tube directs fluid toward a rear face of the single valve and into a combustion chamber during the intake cycle.

15. The cylinder head assembly of claim 12, wherein the distal end of the venturi tube deflects fluid exiting the combustion chamber port.

16. The cylinder head assembly of claim 12, wherein a high pressure portion of the venturi tube is operably coupled to the cylinder head body proximate the intake port and the distal end of the venturi tube is disposed inwardly of the combustion chamber port.

17. The cylinder head assembly of claim 12, wherein the cylinder head assembly is operably coupled to a valve train assembly, the valve train assembly having an intake cam lobe and an exhaust cam lobe disposed on a crankshaft.

18. An internal combustion engine assembly, comprising:
   a single valve;
   a cylinder head assembly having a cylinder head body with an intake port, an exhaust port, and a combustion chamber port configured to seat the single valve, and a venturi tube
   disposed within the cylinder head body, a high pressure portion of the venturi tube operably coupled to the cylinder head body proximate the intake port and a low pressure portion disposed inwardly of the combustion chamber port, the venturi tube permitting the intake port to remain in fluid communication with the exhaust port through a space between the distal end of the venturi tube and the combustion chamber port when the single valve is biased toward the combustion chamber port and when the single valve is biased away from the combustion chamber port and at all times therebetween: and
   a valve train assembly operably coupled to the cylinder head assembly, the valve train assembly having an intake cam lobe and an exhaust cam lobe disposed on a crankshaft, the intake cam lobe configured to bias the single valve away from the combustion chamber port during the intake cycle and the exhaust cam lobe configured to bias the single valve away from the combustion chamber port during the exhaust cycle.

19. The internal combustion engine assembly of claim 18, wherein the intake cam lobe and the exhaust cam lobe are on opposing sides of the crankshaft.

20. The internal combustion engine assembly of claim 19, wherein the valve train assembly includes a push rod interposed between a valve lifter and a rocker arm, the valve lifter configured to alternatively engage the intake cam lobe and the exhaust cam, the rocker arm configured to intermittently actuate the single valve.

* * * * *